(12) United States Patent
Hsiao (10) Patent No.: US 6,460,443 B1
(45) Date of Patent: Oct. 8, 2002

(54) DEVICE FOR CUTTING SHEET MATERIALS

(75) Inventor: Chin Tsung Hsiao, Chong Ho (TW)

(73) Assignee: Tex Year Industries Inc., Taipei Hsien (TW)

( * ) Notice: Subject to any disclaimer, the term of this patent is extended or adjusted under 35 U.S.C. 154(b) by 0 days.

(21) Appl. No.: 09/760,049

(22) Filed: Jan. 12, 2001

(51) Int. Cl.[7] .............................................. B26D 5/10
(52) U.S. Cl. ............................. 83/614; 83/455; 83/481
(58) Field of Search ......................... 83/614, 485, 455, 83/564, 588, 481, 607–609, 13; 144/286.1, 286.5, 287

(56) References Cited

U.S. PATENT DOCUMENTS

| | | | |
|---|---|---|---|
| 5,069,097 A | * 12/1991 | Mori | 83/56 |
| 5,322,001 A | * 6/1994 | Boda | 83/485 |
| 5,365,820 A | * 11/1994 | Mori | 83/455 |
| 5,524,515 A | * 6/1996 | Boda | 83/455 |
| 5,768,965 A | * 6/1998 | Gonzalez et al. | 83/440 |
| 5,802,942 A | * 9/1998 | Cornell et al. | 83/455 |
| 5,996,459 A | * 12/1999 | Cornell et al. | 83/485 |
| 6,079,307 A | * 6/2000 | Mori | 83/564 |
| 6,098,515 A | * 8/2000 | Daley, Jr. | 83/485 |
| 6,119,567 A | * 9/2000 | Schindler et al. | 83/171 |

* cited by examiner

Primary Examiner—Kenneth E. Peterson
Assistant Examiner—Omar Flores Sánchez (57) ABSTRACT

A sheet material cutting device includes a base having two brackets, two arms pivotally secured to the brackets, a track secured between the arms and rotated in concert with the arms relative to the brackets, a seat slidably engaged on the track and movable along the track, and a cutter blade secured to the seat. The cutter blade may be forced toward the base in order to forcefully and effectively cut the sheet materials. A board detachably secured to the base, and a plate selectively secured to the board for increasing the surface for supporting the sheet materials.

3 Claims, 9 Drawing Sheets

DEVICE FOR CUTTING SHEET MATERIALS

BACKGROUND OF THE INVENTION

1. Field of the Invention

The present invention relates to a cutting device, and more particularly to a device for cutting sheet materials.

2. Description of the Prior Art

Typical sheet material cutting devices comprise a base having an integral area that may not be adjusted to different areas, and includes a single cutter blade that may not be changed with the other cutter blades.

The present invention has arisen to mitigate and/or obviate the afore-described disadvantages of the conventional sheet material cutting devices.

SUMMARY OF THE INVENTION

The primary objective of the present invention is to provide a sheet material cutting device including a base that may be adjusted to different areas.

The other objective of the present invention is to provide a sheet material cutting device including one or more cutter blades that may be easily changed or replaced with each other.

In accordance with one aspect of the invention, there is provided a sheet material cutting device comprising a base for supporting sheet materials to be cut, the base including two brackets disposed thereon, two arms each including a first end pivotally secured to the bracket with a pivot axle, a track secured between the arms and rotated in concert with the arms relative to the brackets, a seat slidably engaged on the track and movable along the track, and a cutter blade secured to the seat and forcible toward the base to cut the sheet materials. The cutter blade may be forced toward the base in order to forcefully and effectively cut the sheet materials.

The seat includes a protrusion slidably engaged into the track for slidably securing and for guiding the seat to slide along the track.

A board is further provided and includes a depression formed therein for receiving the base, the base and the board have an upper surface flush with each other for supporting the sheet materials.

The board includes at least one cavity formed therein, the base includes at least one projection extended therefrom and engaged into the cavity of the board for detachably securing the base to the board.

A plate is further provided and includes at least one ear secured to the board, the plate and the board have an upper surface flush with each other for supporting the sheet materials.

The base includes a guide channel formed therein, and includes a drawer slidably received in the guide channel of the base. One or more spare cutter blades are further provided and secured in the drawer.

The drawer includes at least one retainer disposed therein for retaining the spare cutter blade in the drawer. A pincer is further provided and secured in the drawer for fetching the cutter blades.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Referring to the drawings, and initially to FIGS. 1–5, a sheet material cutting device in accordance with the present invention comprises a base 21 including a soft or resilient strap 23 secured on top thereof, and comprises two brackets 26 disposed thereon and preferably separated from each other and disposed on the end thereof. Two arms 32 each has one end pivotally secured to the brackets 26 with a pivot axle 28. A guide track 31 is secured between the arms 3?2, and preferably secured between the other ends of the arms 32, such that the track 31 may be rotated relative to the base 21 about the pivot axles 28.

Figure 1:
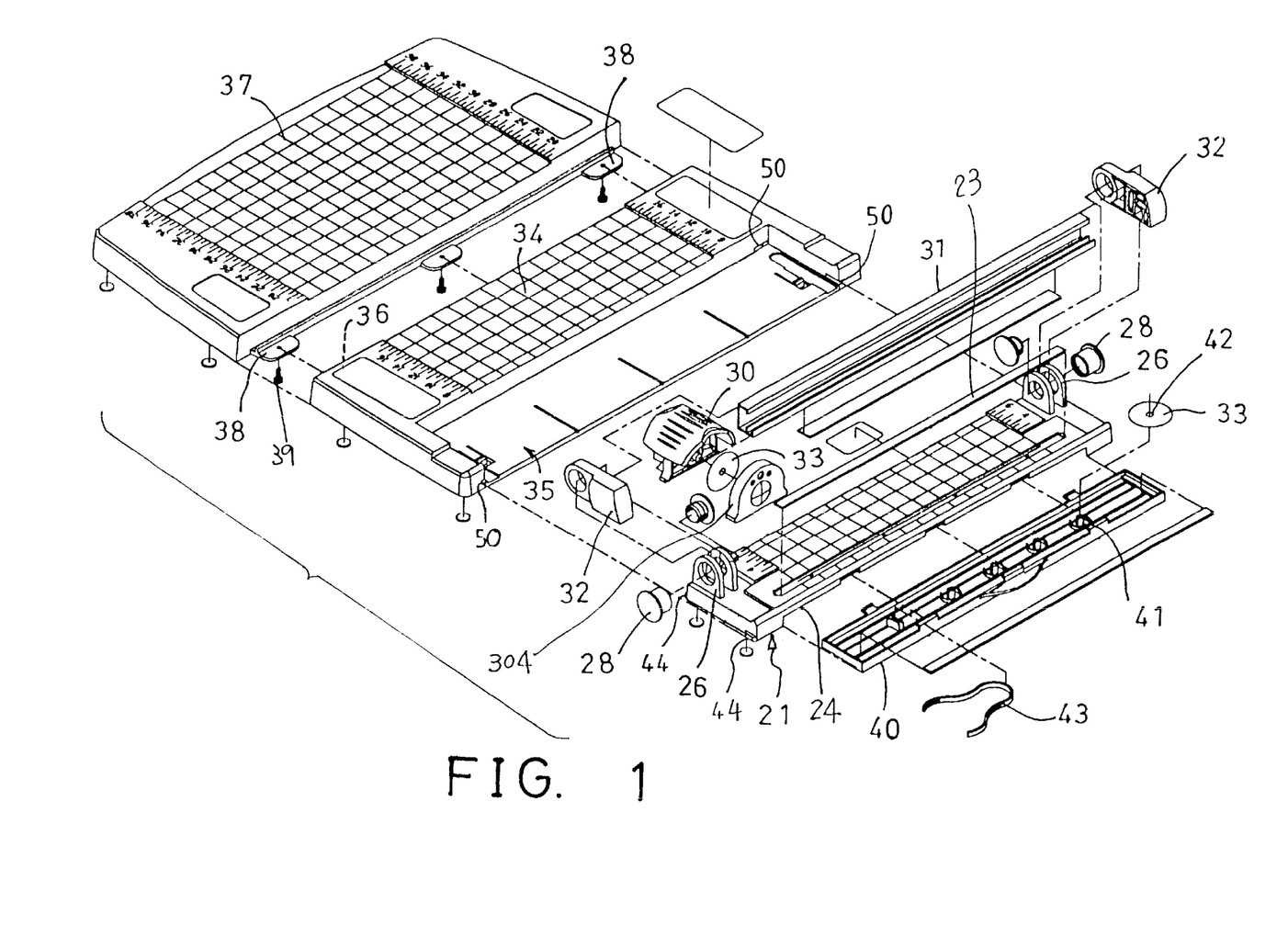
FIG. 1 is an exploded view of a sheet material cutting device in accordance with the present invention.
Figure 2:
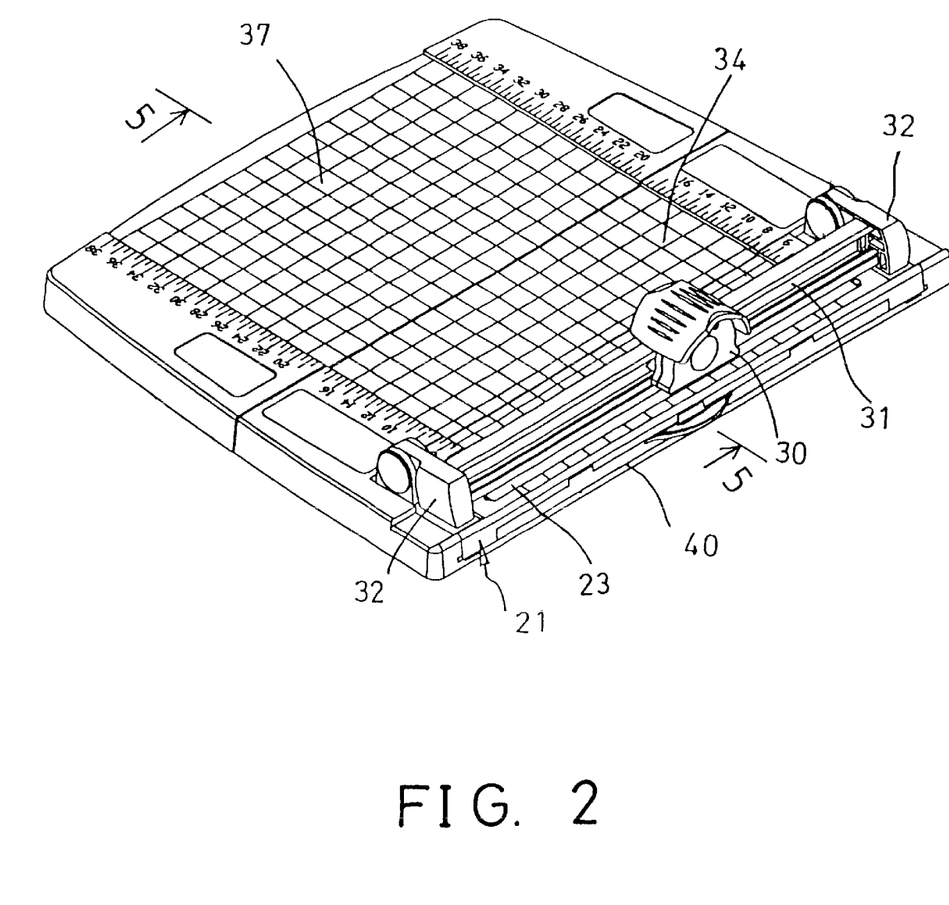
FIG. 2 is a perspective view of the sheet material cutting device.
Figure 3:
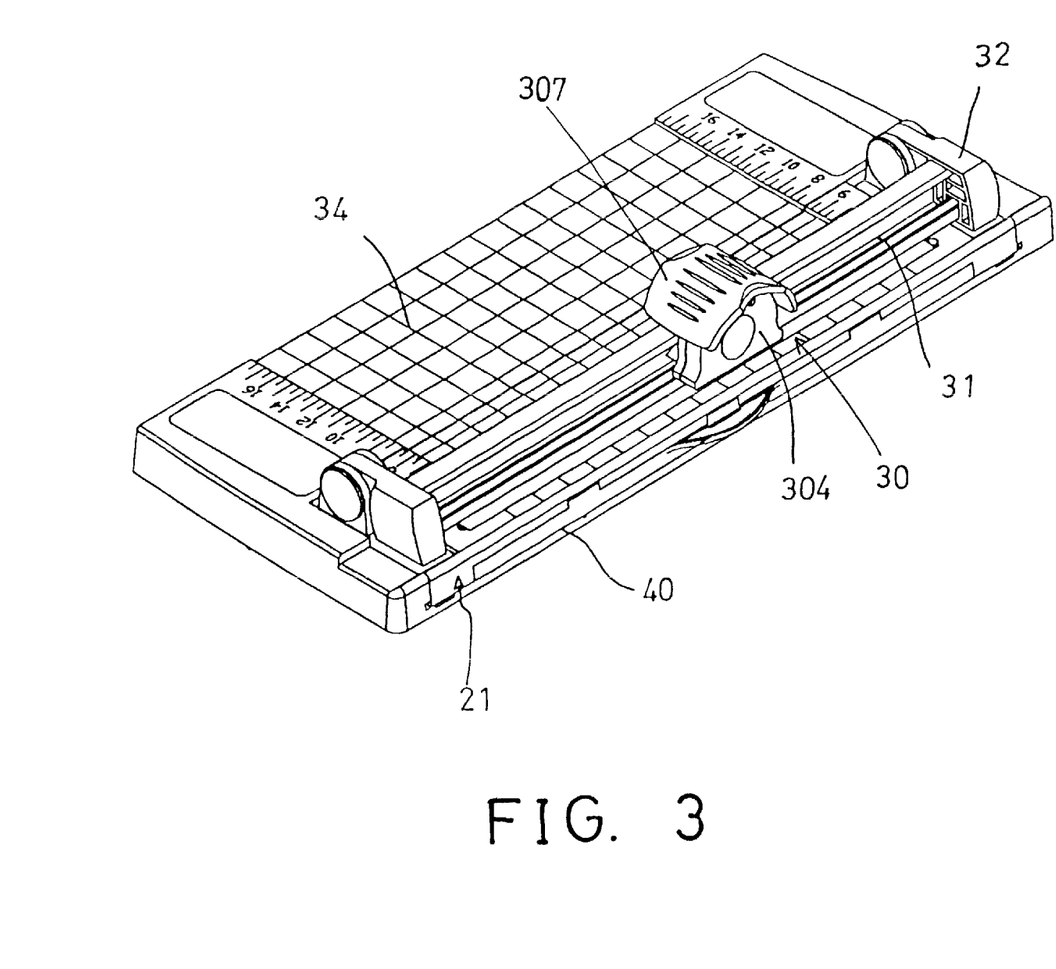
FIGS. 3 and 4 are perspective views showing the different arrangements of the sheet material cutting device.
Figure 4:
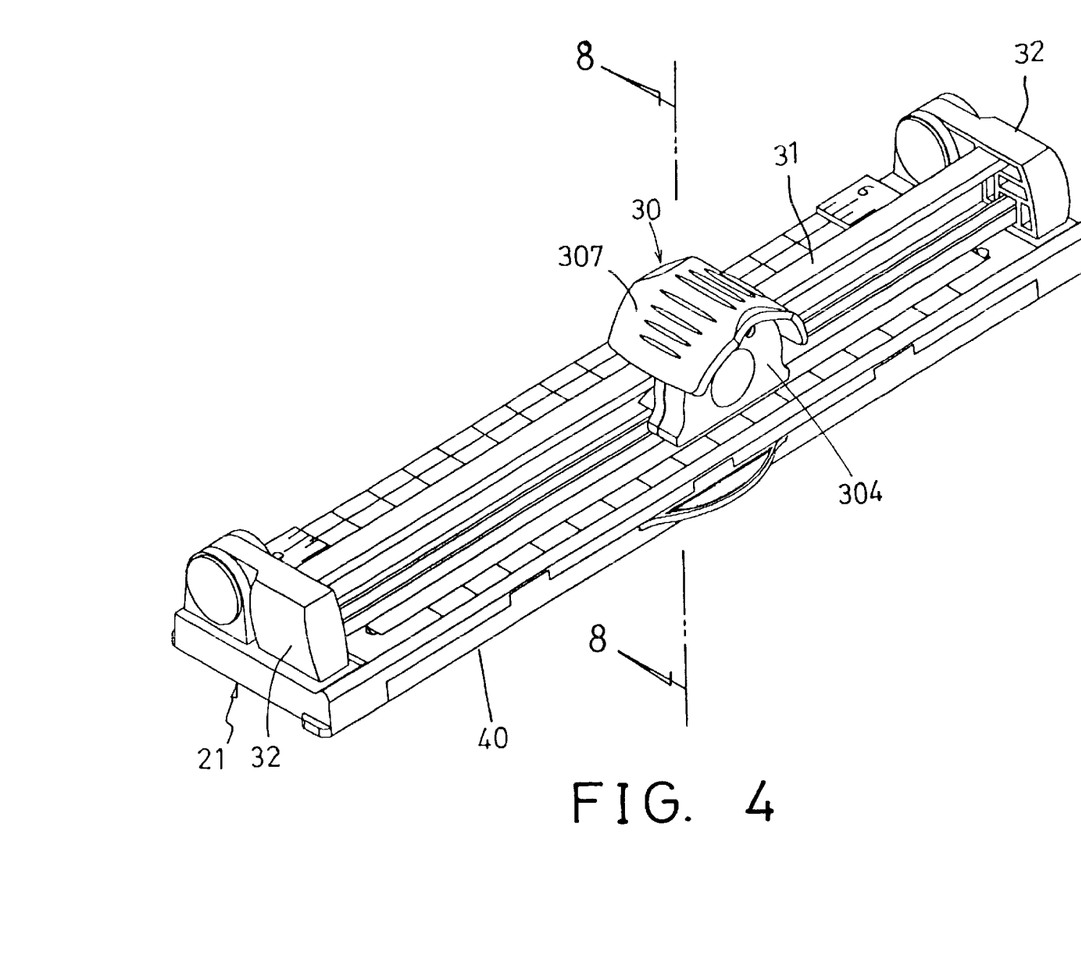
Figure 5:
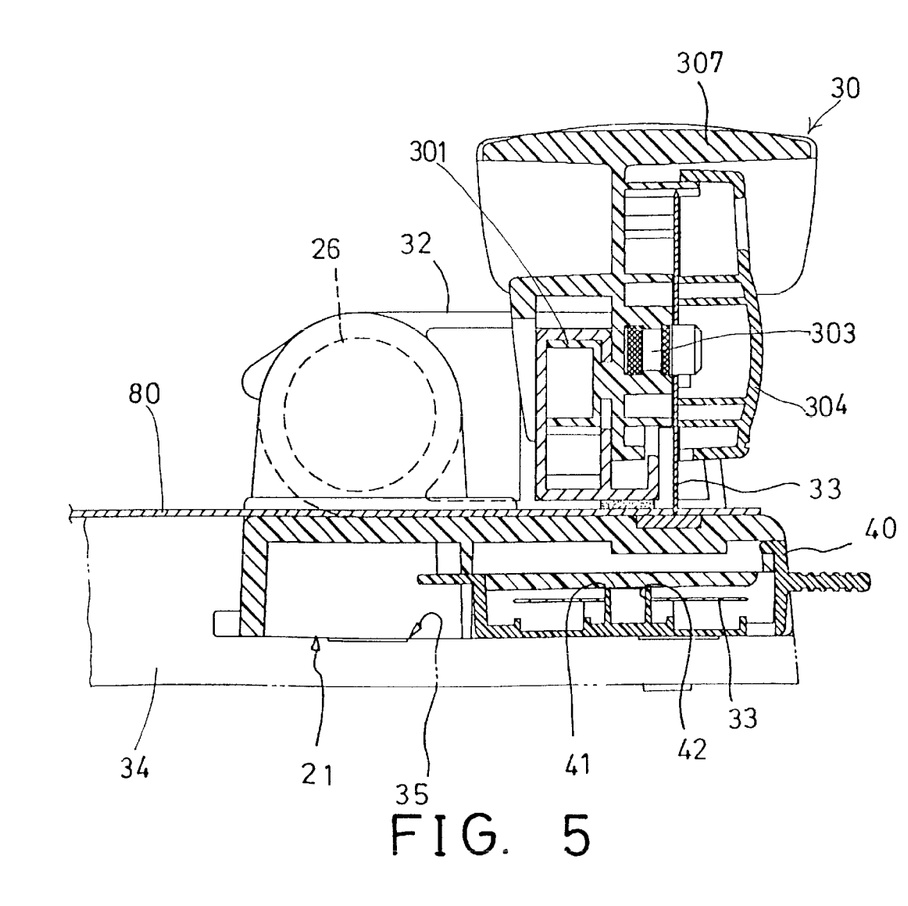
FIG. 5 is a partial cross sectional view taken along lines 5—5 of FIG. 2.
Figure 6:
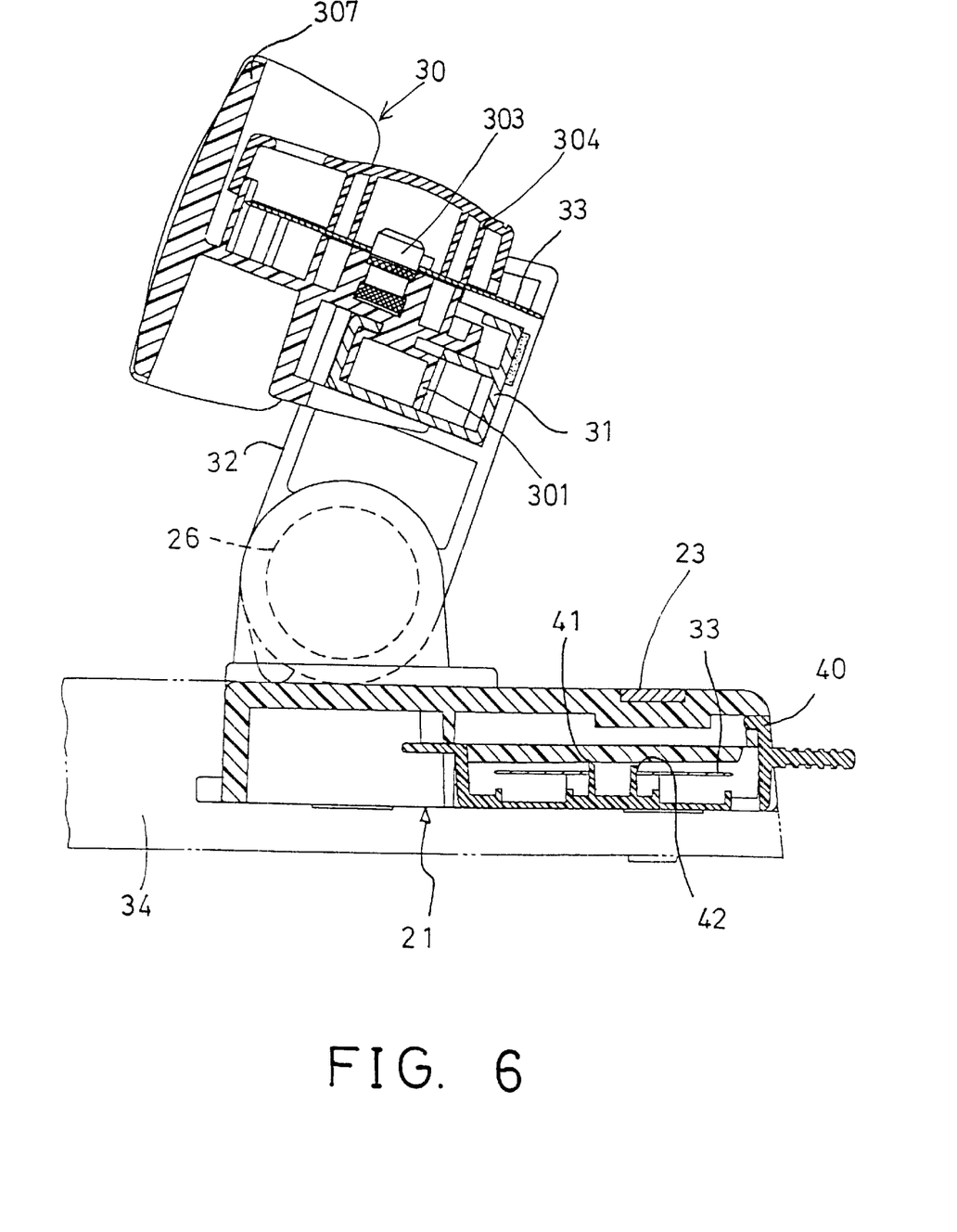
FIG. 6 is a partial cross sectional view similar to FIG. 5, illustrating the operation of the sheet material cutting device.
Figure 7:
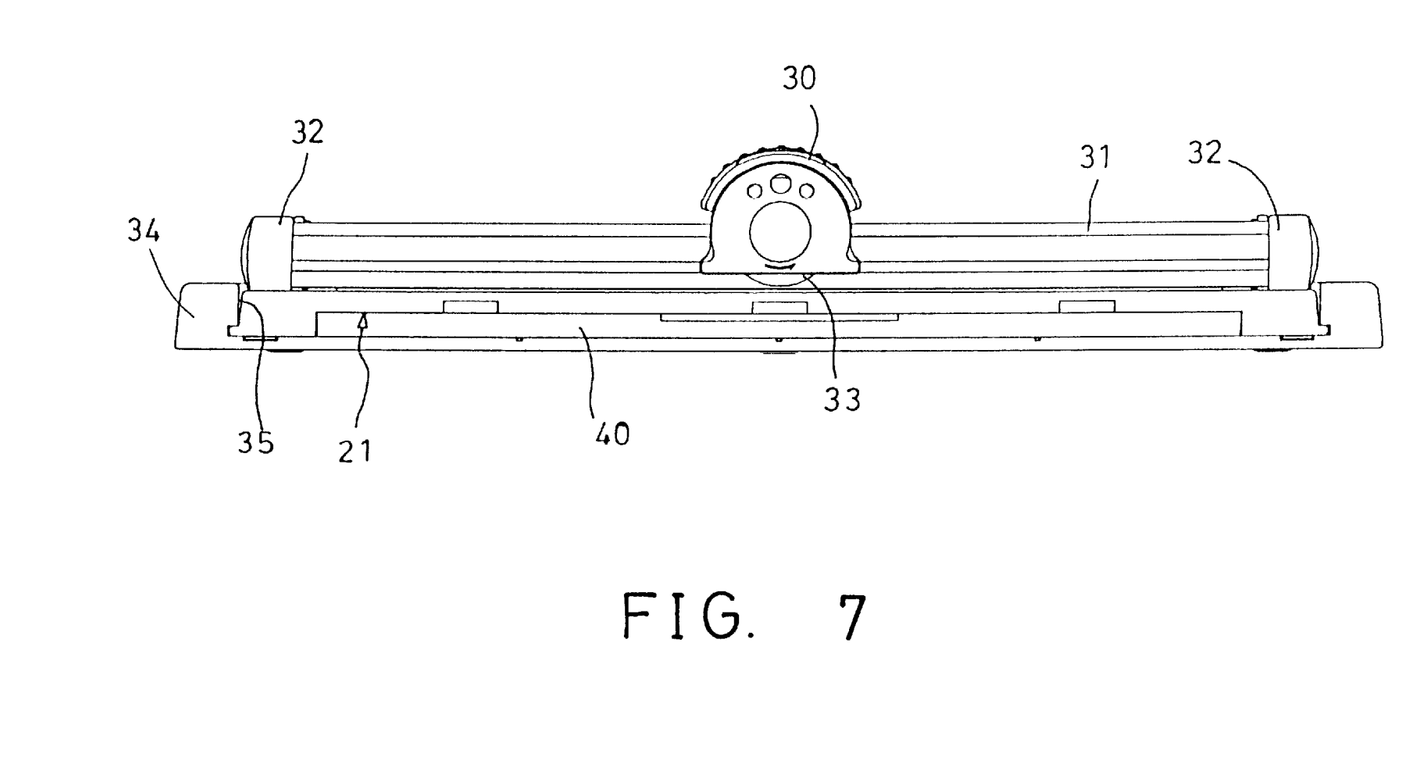
FIG. 7 is a front plane view of the sheet material cutting device.
Figure 8:
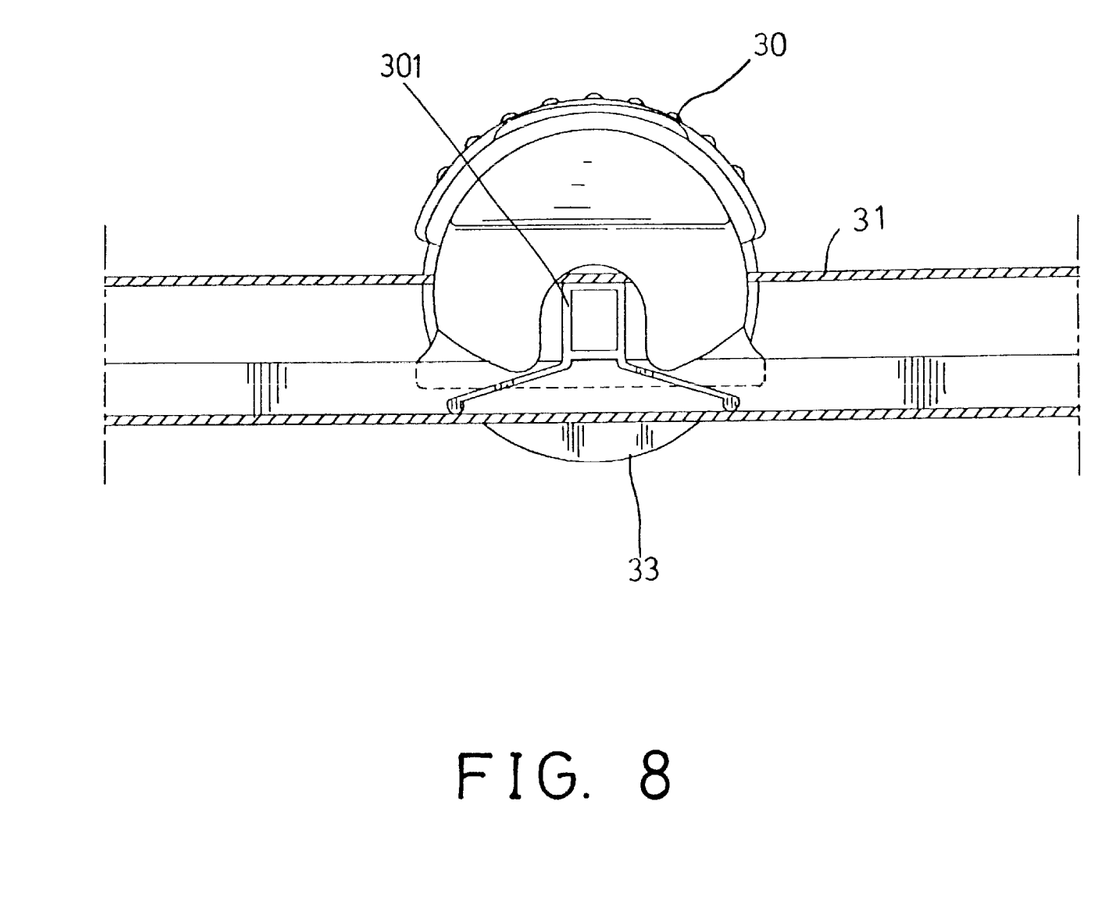
FIG. 8 is a partial cross sectional view taken along lines 8—8 of FIG. 4.

A seat 30 includes a protrusion 301 (FIGS. 5, 6) extended therefrom and slidably engaged in the track 31 for guiding the seat 30 to move along the track 31. A cutter blade, such as a circular cutter blade 33 is rotatably secured to the seat 30 with a fastener or a pivot pin 303. A cover 304 is secured to the seat 30 for shielding the cutter blade 33. The seat 30 may be moved along the track 31 (FIGS. 7, 8), and may be moved away from and toward the base 21 by rotating the track 31 about the pivot axles 28 (FIGS. 5, 6) in order to cut the sheet materials 80 (FIG. 5) that is provided on the base 21. An inverted U-shaped cap 307 is secured on top of the seat 30 for allowing the cutter blade 33 to be forced to cut the sheet materials 80.

The sheet material cutting device further includes a board 34 having a depression 35 formed therein for receiving the base 21, and having one or more cavities 50 formed therein and communicating with the depression 35 thereof. The base 21 includes one or more projections 44 extended forward or sidewise therefrom for engaging into the cavities 50 of the board 34 and for detachably securing to the board 34 with a force-fitting engagement, for example. The base 21 includes an upper surface flush with the upper surface of the board 34 such that the surface of the cutting device for supporting the sheet materials may be increased or enlarged or extended.

The sheet material cutting device further includes a plate 37 having one or more ears 38 extended therefrom for engaging into the end portion 36 of the board 34 and for securing to the board 34 with fasteners 39. The upper surfaces of the board 34 and of the plate 37 are flush with each other such that the surface of the cutting device for supporting the sheet materials may further be increased or enlarged or extended.

Figure 9:
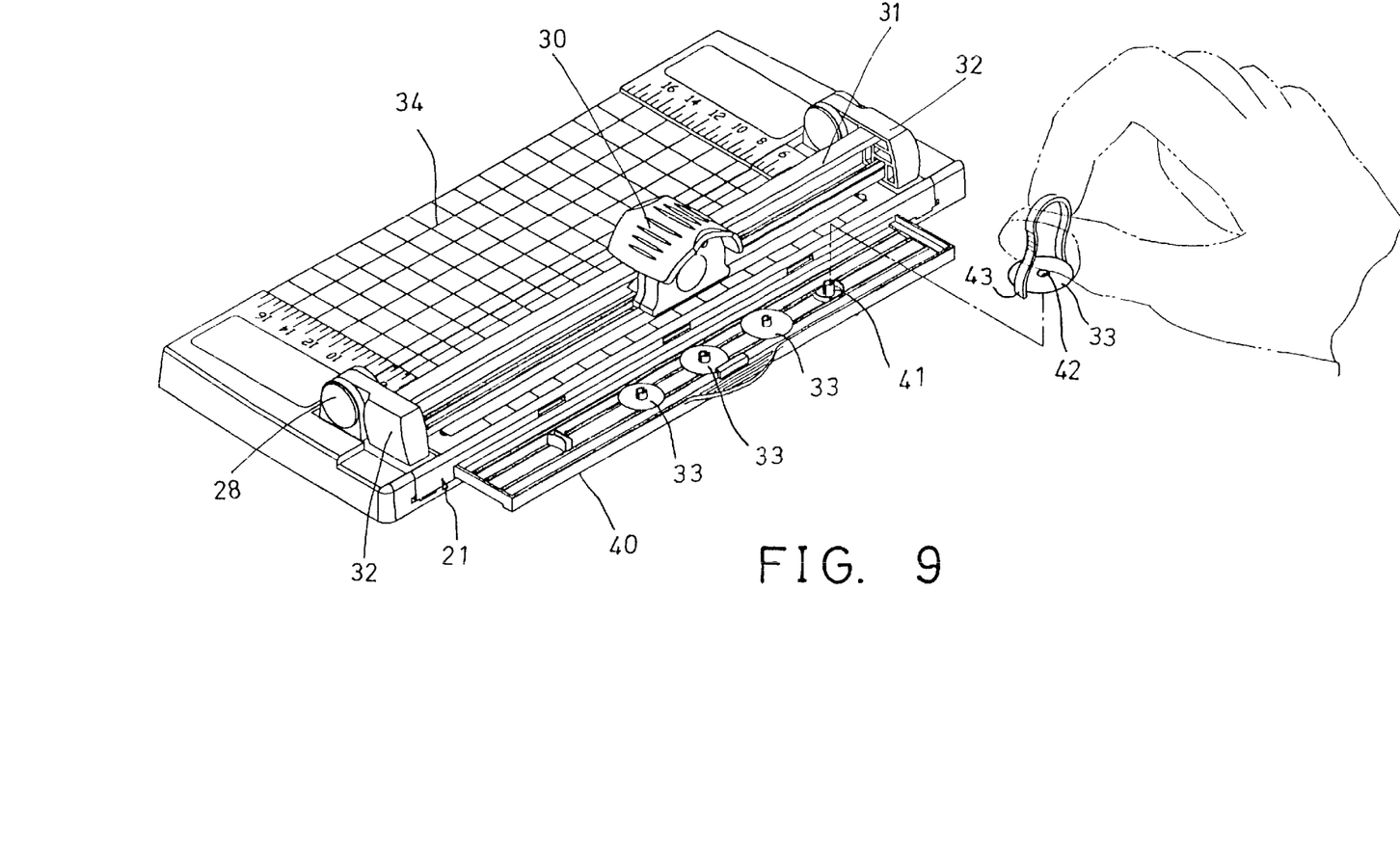
FIG. 9 is a perspective view illustrating the operation of the sheet material cutting device.

Referring next to FIG. 9 and again to FIGS. 1–4, the base 21 includes an opening or a guide channel 24 formed in the front and bottom portion thereof. A drawer 40 is slidably received in the guide channel 24 of the base 21 and includes one or more retainers 41 provided therein for engaging with the center holes 42 of the cutter blades 34 and for retaining one or more spare cutter blades 33 in the drawer 40. A pincer 43 is further provided and received in the drawer 40 for fetching the cutter blade 33 (FIG. 9) and for allowing the cutter blades 33 to be easily disengaged from the drawer 40 and to be easily attached onto the seat 30.

Accordingly, the sheet material cutting device in accordance with the present invention includes a base that may be adjusted to different areas, and includes one or more cutter blades that may be easily changed or replaced with each other.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A sheet material cutting device comprising:

a base for supporting sheet materials to be cut, said base including two brackets disposed thereon, said base including at least one projection extended therefrom, said base including a guide channel formed therein, a drawer slidably received in said guide channel of said base, said drawer including at least one retainer disposed therein, at least one spare cutter blade detachably secured in said at least one retainer of said drawer, two arms each including a first end pivotally secured to said bracket with a pivot axle, a track secured between said arms and rotated in concert with said arms relative to said brackets, a seat slidably engaged on said track and movable along said track, a cutter blade secured to said seat and forcible toward said base to cut the sheet materials, and a board including a depression formed therein for receiving said base, said base and said board including an upper surface flush with each other for supporting the sheet materials, said board including at least one cavity formed therein, said at least one projection of said base being engaged into said at least one cavity of said board for detachably securing said base to said board.

2. The sheet material cutting device according to claim 1 further comprising a plate including at least one ear secured to said board, said plate and said board including an upper surface flush with each other for supporting the sheet materials.

3. The sheet material cutting device according to claim 1 further comprising a pincer secured in said drawer.

* * * * *